(12) United States Patent
Evans et al.

(10) Patent No.: US 8,598,980 B2
(45) Date of Patent: Dec. 3, 2013

(54) BIOMETRICS WITH MENTAL/PHYSICAL STATE DETERMINATION METHODS AND SYSTEMS

(75) Inventors: Scott Charles Evans, Burnt Hills, NY (US); Rebecca Brown, Clifton Park, NY (US); Michael Tin-Lung Chan, Bedford, MA (US); Rahul Bhotika, Schenectady, NY (US); Srinivas Chukka, San Jose, CA (US); David W. Hagan, Orlando, FL (US); Ken R. Turner, Bristow, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 708 days.

(21) Appl. No.: 12/838,964

(22) Filed: Jul. 19, 2010

(65) Prior Publication Data
US 2012/0016827 A1    Jan. 19, 2012

(51) Int. Cl.
*G05B 19/00* (2006.01)
*B60R 25/00* (2013.01)

(52) U.S. Cl.
USPC .......... 340/5.52; 340/5.53; 340/5.7; 340/5.8; 340/5.81; 340/5.82

(58) Field of Classification Search
None
See application file for complete search history.

(56) References Cited

U.S. PATENT DOCUMENTS

| | | | |
|---|---|---|---|
| 5,719,950 A | 2/1998 | Osten et al. | |
| 5,904,708 A * | 5/1999 | Goedeke | 607/18 |
| 6,219,439 B1 | 4/2001 | Burger | |
| 6,819,219 B1 | 11/2004 | Bolle et al. | |
| 6,879,709 B2 | 4/2005 | Tian et al. | |
| 6,993,378 B2 | 1/2006 | Wiederhold et al. | |
| 6,996,256 B2 | 2/2006 | Pavlidis | |
| 7,135,980 B2 | 11/2006 | Moore et al. | |
| 7,138,905 B2 | 11/2006 | Pavlidis et al. | |
| 7,145,477 B1 | 12/2006 | McBain | |
| 7,444,007 B2 | 10/2008 | Schonberg et al. | |
| 7,483,964 B1 | 1/2009 | Jackson et al. | |
| 8,344,849 B2 * | 1/2013 | Larsson et al. | 340/5.2 |
| 2003/0128099 A1 | 7/2003 | Cockerham | |
| 2003/0133597 A1 | 7/2003 | Moore et al. | |
| 2003/0135097 A1 | 7/2003 | Wiederhold et al. | |
| 2003/0197593 A1 * | 10/2003 | Siegel et al. | 340/5.52 |
| 2006/0002598 A1 * | 1/2006 | Rowe et al. | 382/124 |
| 2006/0064037 A1 | 3/2006 | Shalon et al. | |
| 2006/0104484 A1 | 5/2006 | Bolle et al. | |
| 2006/0184801 A1 | 8/2006 | Wood et al. | |
| 2006/0190822 A1 | 8/2006 | Basson et al. | |

(Continued)

FOREIGN PATENT DOCUMENTS

JP    A-2005-293209    10/2005

*Primary Examiner* — Steven Lim
*Assistant Examiner* — Omeed Alizada
(74) *Attorney, Agent, or Firm* — Oblon, Spivak, McClelland, Maier & Neustadt, L.L.P.

(57) ABSTRACT

Methods and systems for determining whether a particular individual is to be granted, among other things, access to information, access to a particular room or other space, or permission to perform a given act or transaction are disclosed. For example, disclosed is an exemplary method that includes performing multiple biometrics tests on the individual to retrieve multiple biometrics test results, performing at least a first data fusion operation on the multiple biometrics test results to determine an identity result, performing at least one biological state test to determine one or more biological state test results of the individual, and conditionally granting authority to the individual based on the identity result and the one or more biological state results.

21 Claims, 3 Drawing Sheets

(56) References Cited

U.S. PATENT DOCUMENTS

| | | |
|---|---|---|
| 2006/0236120 A1 | 10/2006 | Jones et al. |
| 2006/0259304 A1* | 11/2006 | Barzilay ................ 704/273 |
| 2007/0038035 A1 | 2/2007 | Ehrlich et al. |
| 2007/0063816 A1 | 3/2007 | Murakami et al. |
| 2007/0122003 A1 | 5/2007 | Dobkin et al. |
| 2007/0167689 A1 | 7/2007 | Ramadas et al. |
| 2008/0091515 A1 | 4/2008 | Thieberger et al. |
| 2008/0104415 A1 | 5/2008 | Palti-Wasserman et al. |
| 2008/0170758 A1 | 7/2008 | Johnson et al. |
| 2008/0183052 A1 | 7/2008 | Teller et al. |
| 2008/0229408 A1 | 9/2008 | Dinges et al. |
| 2008/0252727 A1 | 10/2008 | Brown et al. |
| 2008/0260211 A1 | 10/2008 | Bennett et al. |
| 2008/0285814 A1 | 11/2008 | Di Carlo et al. |
| 2008/0288406 A1 | 11/2008 | Seguin et al. |
| 2008/0306872 A1 | 12/2008 | Felsher |
| 2009/0024050 A1 | 1/2009 | Jung et al. |
| 2009/0024641 A1 | 1/2009 | Quigley et al. |
| 2009/0025081 A1 | 1/2009 | Quigley et al. |
| 2009/0201122 A1* | 8/2009 | Stobbe ................ 340/3.1 |

* cited by examiner

BIOMETRICS WITH MENTAL/PHYSICAL STATE DETERMINATION METHODS AND SYSTEMS

RELATED FIELD

This disclosure relates to methods and systems directed to both identifying an individual and determining a mental and/or physical state of the individual in order to determine whether the individual is to be allowed some form of authority.

BACKGROUND

In today's world, there are a near endless number of systems, locations and transactions that are subject to some form of security. Generally, such security is accommodated by means of devices such as keys, identification badges, and password/passcode entry systems. There are, however, systems, locations and transactions that are subject to some form of heightened security and where some form of biometrics-based identification is made to accommodate the heightened security requirements. Unfortunately, even biometrics-based security systems are subject to shortcomings, thus risking resources, information, locations and transactions to unauthorized access or permission. Accordingly, new and improved methods and systems for determining whether an individual should be granted access or permission are desirable.

SUMMARY

Various aspects and embodiments of the invention are described in further detail below.

In an embodiment, a method determining whether a particular individual may be granted authority is disclosed. The method includes performing multiple biometrics tests on the individual to retrieve multiple biometrics test results, performing at least a first data fusion operation on the multiple biometrics test results to determine an identity result, performing at least one biological state test to determine one or more biological state test results of the individual, and conditionally granting authority to the individual based on the identity result and the one or more biological state results.

In another embodiment, a system for determining whether a particular individual may be granted authority includes identity sensing circuitry configured to perform multiple biometrics tests on the individual to retrieve multiple biometrics test results, identity fusion circuitry configured to perform at least a first data fusion operation on the multiple biometrics test results to determine an identity result, biological state testing circuitry configured to perform at least one biological state test, biological state processing circuitry configured to determine one or more biological state test results of the individual based on the at least one biological state test, and decision circuitry configured to grant authority to the individual based on the identity result and the one or more biological state results.

In yet another embodiment, a system for determining whether a particular individual may be granted authority includes a biometrics test means for performing multiple biometrics tests on the individual to retrieve multiple biometrics test results, a biometrics processing means for performing at least a first data fusion operation on the multiple biometrics test results to determine an identity result, a biological state test means for performing at least one biological state test, a biological state processing means for determining one or more biological state test results of the individual based on the at least one biological state test, and a decision means for conditionally granting authority to the individual based on the identity result and the one or more biological state results.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Figure 1:
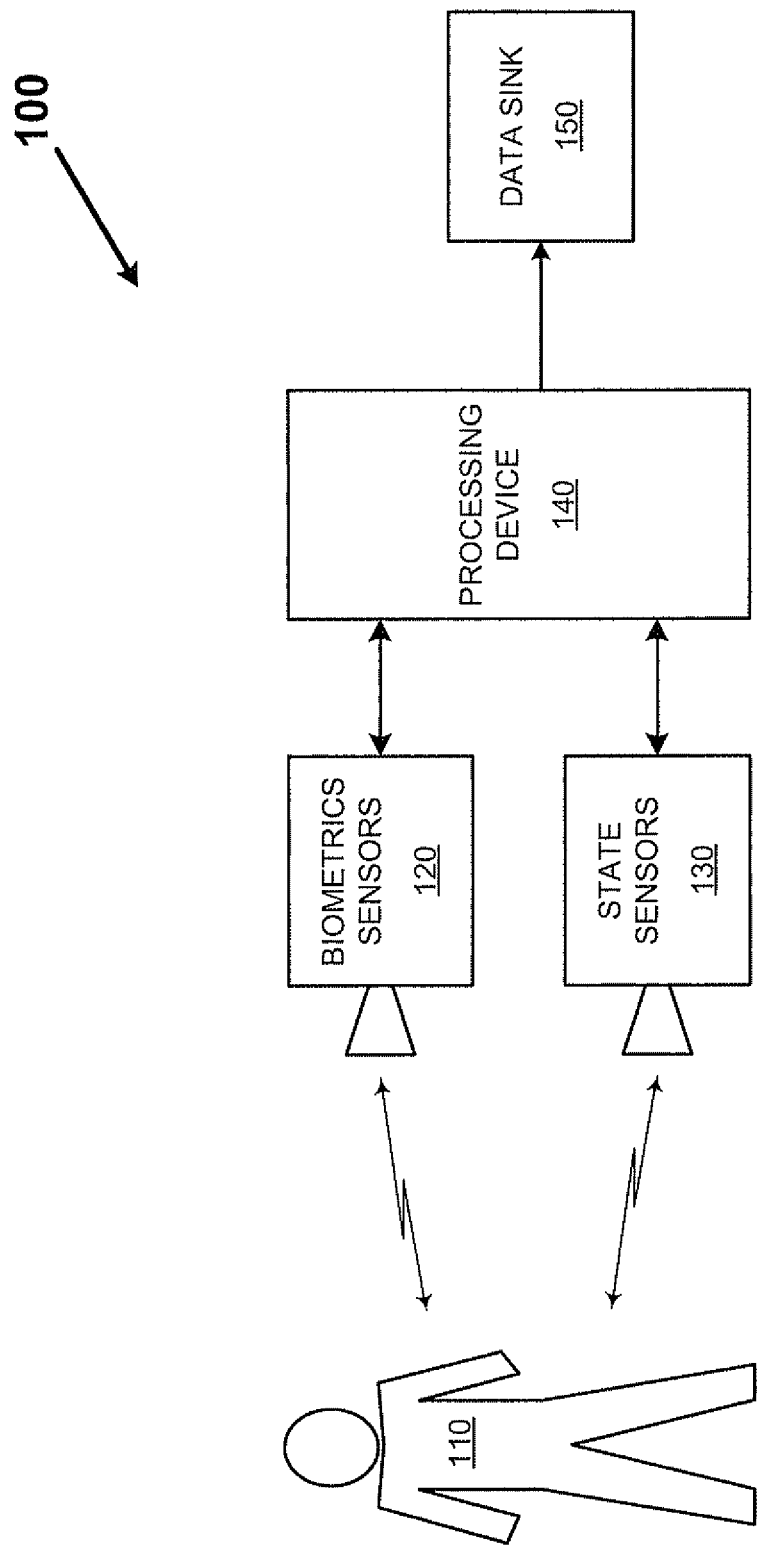
FIG. 1 depicts a biometrics and biological state sensing and processing system.

FIG. 1 depicts a biometrics and biological state sensing and processing system 100. As shown in FIG. 1, the system 100 includes an individual under test 110, a set of biometrics sensors 120, a set of state sensors 130, a processing device 140 and a data sink 150.

In operation, the biometrics sensors 120 can perform any number of biometrics tests on the individual 110 designed to ascertain or confirm the identity of the individual 110. Such tests can include, by way of non-limiting examples, any of a deoxyribonucleic acid (DNA) analysis, a voice recognition analysis, a face recognition analysis, an iris pattern analysis, a blood vessel pattern analysis, a fingerprint analysis, a palm print analysis, and an analysis of bone structure. Accordingly, the biometrics sensors can include any combination of known or later-developed arrangement capable of assessing biometric information, such as DNA processing equipment, optical-based sensors, sound-based sensors, electromagnetic sensors, chemical sensors, mass sensors, electric field sensors, X-Ray equipment, NMI equipment, CT Scanning equipment, and so on.

Similarly, the biological state sensors 140 can perform any number of appropriate tests on individual 110 designed to ascertain various physical and emotional states of the individual 110, such as whether the individual is asleep, intoxicated or under stress. Such tests can include, by way of non-limiting examples, a polygraph, a facial expression analysis, a voice stress analysis, a speech analysis, a body motion analysis, and electrocardiography (EKG) analysis, an electroencephalography (EEG) analysis, a blood content (e.g., drug, alcohol or gas content) analysis, a urine content analysis, a breath content analysis, a hair content analysis, and a heart-rate analysis. Accordingly, as with the biometric sensors, the biological state sensors (which can be combined with appropriate biometrics sensors) can include any combination of known or later-developed arrangement capable of assessing physical or emotional state information, such as optical-based sensors, sound-based sensors, electromagnetic sensors, chemical sensors, electric field sensors, perspiration sensors, and so on.

Both the biometrics sensors 120 and the biological state sensors 130 can be adjustable based upon various environmental conditions, as well as based upon commands from the processing device 140. For example, optical sensors embedded in the biometrics sensors 120 may be automatically adjusted for ambient light, while the biological state sensors 130 might be adjusted/calibrated based upon a command from the processing device 140. After accumulating sensor information from various tests, the biometrics sensors 120 and the biological state sensors 130 can forward whatever test information they've accumulated to the processing device 140. For the purpose of this disclosure, it is to be appreciated that the term "test information" may be construed broadly, and that such test information may include anything from raw sensor data to data that has been processed, at least in part, to reflect characteristics of raw data. For example, a voice sensor may provide as its output a stream of digitized voice data to the processing device 140 or alternatively provide packets of information reflecting words spoken by an individual as part of the voice sensor's speech-to-text processing capability along with frequency information reflecting the loudness and major frequency components of each word spoken. Similarly, a polygraph might provide raw physiological data to the processing device 140, or alternatively provide parameters reflecting the likelihood that a particular individual under test is truthful with individual answers.

In response to received sensor test information, the processing device 140 can perform any number of known or later-developed processing operations on either or both the biometrics and biological state sensor information. For example, the processing device 140 can process any single set of biometrics data, such as a palm print, to determine the identity of the individual 110. Alternatively, the procession device 140 may perform a fusion of different biometrics information, such as combining palm print and iris pattern information to determine the identity of the individual 110 with the result being an identity result with a higher likelihood of being correct. In various embodiments, fusion of biometrics information may be had using any number or combination of processing schemes, such as weighting multiple biometrics test results and applying a threshold to the weighted sum of the test results, processing multiple biometrics test results using an artificial neural network, processing multiple biometrics test results using an artificial intelligence program, and processing multiple biometrics test results using an expert system.

The processing device 140 may perform similar operations on the biological state information so as to determine any number of biological state results. Such results may include, for example, whether the individual is awake or asleep, cooperative or uncooperative, under stress or duress, intoxicated to some degree or otherwise judgment impaired, under mental delusions, nervous, physically ill, and so on.

The processing device 140 may then make a decision as to whether the individual is to be granted the appropriate authority under the circumstances. By way of example, the processing device 140 may allow permission to an individual to enter a room only if the individual's identity is confirmed and that the individual is confirmed to not be under likely duress. Similarly, permission for an individual to drive an automobile might be granted only if the individual is determined to be the automobile's owner and that a breath analysis indicates a blood alcohol content less than 0.01%.

Upon determination of a permission or access result, the appropriate permission/access information may be sent from the processing device 140 to the data sink 150 noting that the data sink 150 can be any number of devices, such as a controllable door lock, a display, a computer-based access system, a recording device, and so on.

Figure 2:
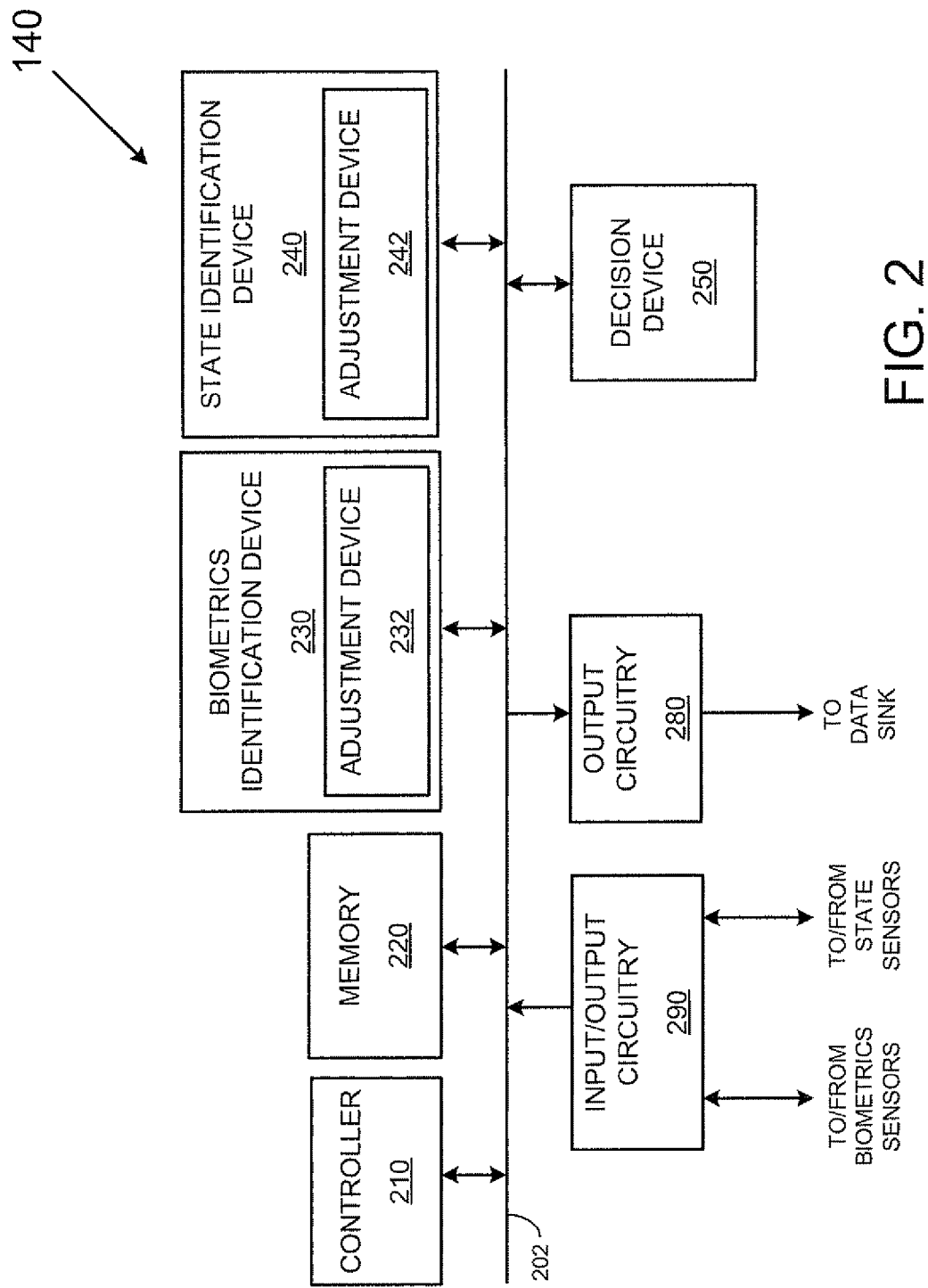
FIG. 2 depicts details of the processing device of FIG. 1.

FIG. 2 depicts details of the processing device 140 of FIG. 1. As shown in FIG. 2, the exemplary processing device 140 includes a controller 210, a memory 220, a biometrics identification device 230, a biological state identification device 240, a decision device 250, output circuitry 280 and input/output circuitry 290. The biometrics identification device 230 includes a first adjustment device 232, and the biological state identification device 240 includes a second identification device 242. The above components 210-290 are coupled together by control/data bus 202.

Although the exemplary processing device 140 of FIG. 2 uses a bussed architecture to depict separate electronic devices coupled together with a common bus, it should be appreciated that any other architecture may be used as is well known to those of ordinary skill in the art. For example, in various embodiments, the various components 210-290 can take the form of separate electronic components coupled together via a series of separate busses. Still further, in other embodiments, one or more of the various components 210-290 can take form of separate servers coupled together via one or more networks.

It also should be appreciated that some or all of the above-listed components can take the form of software/firmware routines residing in memory 220 and be capable of being executed by the controller 210, or even software/firmware routines residing in separate memories in separate servers/computers being executed by different controllers.

In operation, the controller 210 may issue commands and control parameters to any number of remote biometrics sensors, such as those discussed with respect to FIG. 1. Various commands and control parameters might include, for example, commands for starting a particular series of tests and parameters relating to ambient light to control grey-level resolution of light sensors. In response to such commands and control parameters, biometrics sensor information derived from one or more biometrics tests may be received via the input/output circuitry 290 and stored in the memory 220.

Next, the biometrics identification device 230 may access the biometrics test information in memory 220 to determine a biometrics test result. As mentioned above, a biometrics test result may be determined based upon a single biometrics test or upon a fusion of a plurality of biometrics tests using any of a variety of processes, such as determining a weighted sum of biometrics information and applying a threshold to the weighted sum. In various embodiments, the biometrics identification device 230 may be made adaptable using the first adjustment device 232. For instance, using the first adjustment device 232 the biometrics identification device 230 may be adapted to account for aging of an individual, thus allowing for subtle changes in facial features and hair color. Such adaptations of the biometrics identification device 230 may allow for predictable changes or wider variances on biometrics data. Other adaptations of the biometrics identification device 230 may be dependant on the environmental conditions of the pertinent test, such as lighting and temperature. Still other adaptations of the biometrics identification device 230 may be dependent on one or more of the biometrics tests themselves, or possibly upon one or more biological state tests.

Once the biometrics identification device 230 has determined a biometrics test result to identify an individual or confirm the individual's identity, the biometrics identification device 230 can supply the biometrics result to the decision device 250.

Next, in response to command and control parameters issued by the controller 210, biological state test information derived from one or more biological state tests may be received via the input/output circuitry 290 and stored in the memory 220. Note that in various embodiments, it should be appreciated that the second adjustment device 242 may operate according to a minimum description length principle in order to improve or optimize compression of biological state information, which in turn may reduce memory requirements. After the biological state test information is stored in memory 220, the state identification device 240 may access and process the biological state test information to determine any number of biological state test results. As mentioned above, the biological state result(s) may be determined based upon a single biological state test or upon a fusion of a plurality of biological state tests using any of a variety of processes. For example, a determination of whether an individual is under stress may be made by applying an artificial neural network paradigm to both an individual's voice stress information and information regarding the individual's facial expressions. Also, using the second adjustment device 242, biological state tests and subsequent processing of such tests can be customized based on pre-stored normal physiological information of an individual. For instance, assuming that a particular individual is identified using a biometrics test result, the biological state identification device 240 can retrieve "normal" information relating to the individual, such as parameters relating to the individual's voice patterns, hand movements, facial expressions and heart rate during both unstressed and stress conditions.

The biological state identification device 240 also may be adapted/adjusted such that a first biological state test can be customized based on a biological state test result of a second biological state test. For example, assuming that a voice stress test indicates that an individual is slurring his speech, the biological state identification device 240 may interpret eye pattern movements and facial expressions differently than if no slurring were detected. Other adaptations made to the biological state identification device 240 may result in response to a macro environment condition affecting the individual, such as an indication of a heightened security alert in a military base, or perhaps an individual environmental condition affecting the individual, such as local lighting conditions.

Once the biological state identification device 240 has determined the appropriate biological state test result(s), the biological state identification device 240 can supply the biological state test result(s) to the decision device 250.

Assuming that the decision device 250 has received the requisite biometrics test result and biological state test result(s), the decision device 250 can conditionally determine whether the individual under test will be granted access or permission. Note that granting access or permission may be conditioned according to changing macro environment conditions affecting the individual. By way of example, the decision devise 250 may remove particular individuals from accessing a particular room under a heightened security alert regardless of whether the state identification device 240 has allowed for increased stress levels as a result of the security alert. Once the decision device 250 has determined whether the individual under test is granted access, permission or some other form of authority, the decision device 250 can supply an indication of the determined access/permission/authority result to some form of data sink via output circuitry 280.

Figure 3:
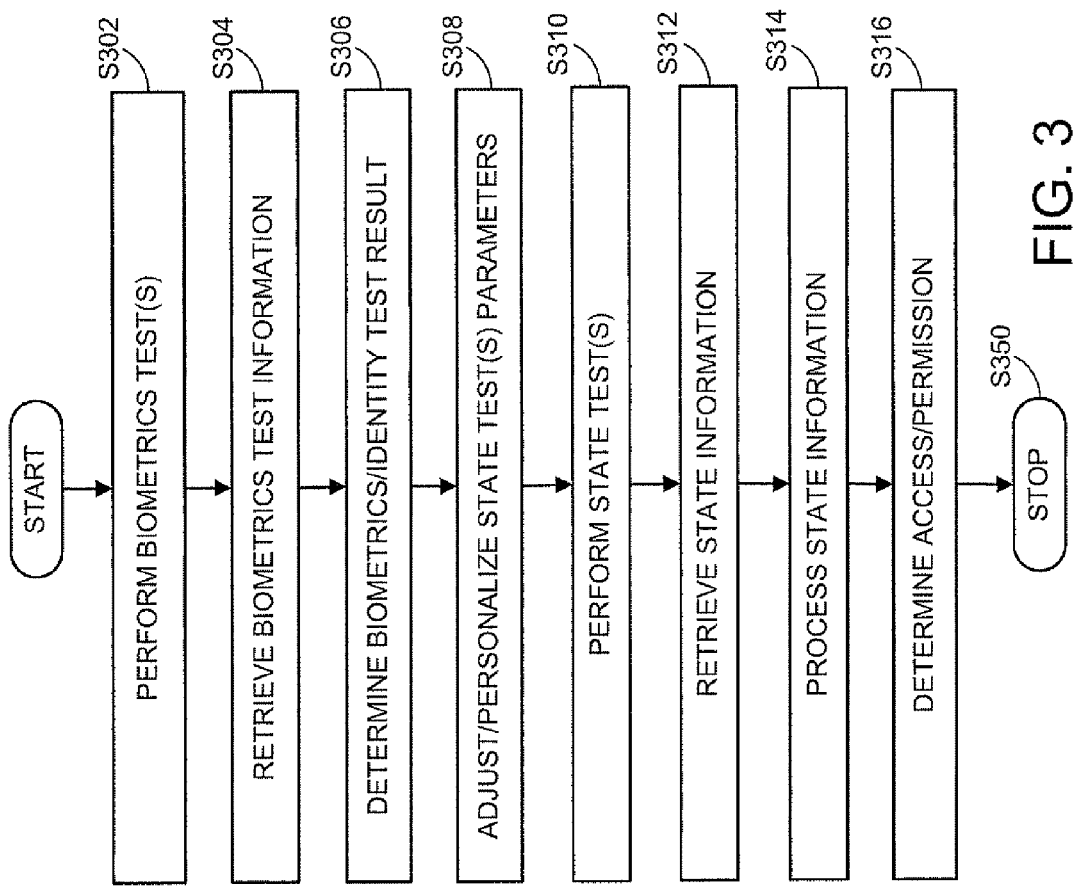
FIG. 3 is a flowchart outlining a first exemplary operation of the disclosed methods and systems.

FIG. 3 is a flowchart outlining a first exemplary operation of the disclosed methods and systems for determining permission or access. While the below-described steps are described as occurring in a particular sequence for convenience, it is to be appreciated by those skilled in the art that the order of various steps may be changed from embodiment to embodiment. It is further to be appreciated that various steps may occur simultaneously or be made to occur in an overlapping fashion.

The process starts in step S302 where one or more biometrics tests can be performed on an individual using any number of known or later developed sensor systems. As discussed above, such biometrics tests can be adapted to various environmental conditions or adapted based on any set of parameters as may be found advantageous or desirable. Next, in step S304 the biometrics test results can be retrieved from the sensor systems. Then, in step S304, the biometrics test results can be processed to determine an identity result either identifying the individual or confirming his identity. As discussed above, when multiple biometrics tests are performed, the various individual test results may be combined using any number of fusion operations, such as weighting multiple biometrics test results and applying a threshold to the weighted test results, processing multiple biometrics test results using an artificial neural network, processing multiple biometrics test results using an artificial intelligence program, processing multiple biometrics test results using an expert system, and so on. Control continues to step S308.

In step S308, various parameters relating to biological state tests can be optionally adjusted/personalized based on a number of circumstances, such as environmental conditions, results of biometrics tests, pre-stored "normal" physiological information of an individual, and so on. Next, in step S310, one or more biological state tests can be performed on the individual under test using any number of known or later developed sensor systems, such as any of the sensor systems described above. Then, in step 312, the biological state test information developed in steps S308-S310 can be retrieved. Control continues to step S314.

In step S314, the retrieved biological state information of step S314 can be processed to determine one or more biological state test results of the individual. As discussed above, biological test results may be determined based upon the information provided by a single sensor or alternatively provided by the fusion of different tests. Next, in step S316, access and/or permission may be conditionally granted to the individual based on the identity result of step S306 and the one or more biological state results of step S314. Control then continues to step S350 where the process stops.

While the above-disclosed methods and systems have been described in conjunction with the specific exemplary embodiments thereof, it is evident that many alternatives, modifications, and variations will be apparent to those skilled in the art. Accordingly, exemplary embodiments of the above-disclosed methods and systems as set forth herein are intended to be illustrative, not limiting. There are changes that may be made without departing from the spirit and scope of the above-disclosed methods and systems.

What is claimed is:

1. A method determining whether a particular individual is to be granted authority, comprising:
    performing multiple biometrics tests on the individual to retrieve multiple biometrics test results;

performing at least a first data fusion operation on the multiple biometrics test results to determine an identity result, wherein the first data fusion operation includes weighting the multiple biometrics test results and applying a threshold to the weighted test results to determine the identity result;

performing at least one biological state test to determine one or more biological state test results of the individual; and conditionally granting authority to the individual based on the identity result and the one or more biological state results.

2. The method of claim 1, wherein the first data fusion operation further includes at least one of processing multiple biometrics test results using an artificial neural network, processing multiple biometrics test results using an artificial intelligence program, and processing multiple biometrics test results using an expert system.

3. The method of claim 2, wherein weighting the multiple biometrics test results and applying the threshold to the weighted test results includes weighting results of each of the multiple biometric tests, summing each of the weighted results to create a weighted sum, and applying the weighted sum to the threshold.

4. The method of claim 1, wherein at least one biometrics test is based on an adaptive system capable of accounting for physiological changes of the individual due to aging.

5. The method of claim 1, wherein at least one biometrics test is one of a deoxyribonucleic acid (DNA) analysis, a voice recognition analysis, a face recognition analysis, an iris pattern analysis, a blood-vessel pattern analysis, a fingerprint analysis, a palm-print analysis, and an analysis of bone structure.

6. The method of claim 1, wherein at least one biometrics test is based on an adaptive system capable of accounting for an environment of the at least one biometrics test.

7. The method of claim 1, wherein at least one biological state test is customized based on pre-stored normal physiological information of an individual identified by the identity result.

8. The method of claim 1, wherein a first biological state test operates under a minimum description length paradigm.

9. The method of claim 1, wherein at least one biological state test is adapted to a macro environment condition affecting the individual.

10. The method of claim 1, wherein the step of performing at least one biological state test includes performing a plurality of biological state tests to determine one or more biological states of the individual.

11. The method of claim 10, further comprising performing a data fusion operation using data from at least two biological state tests to determine a first biological state test result, wherein the step of conditionally granting authority to the individual is based on the first biological state result.

12. The method of claim 1, wherein at least one biological state test is one of a polygraph, a facial expression analysis, a voice stress analysis, a speech analysis, a body motion analysis, and electrocardiography (EKG) analysis, an electroencephalography (EEG) analysis, a blood content analysis, a urine content analysis, a breath content analysis, a hair content analysis, and a heart-rate analysis.

13. A system for determining whether a particular individual is to be granted authority, comprising:

identity sensing circuitry configured to perform multiple biometrics tests on the individual to retrieve multiple biometrics test results;

identity fusion circuitry configured to perform at least a first data fusion operation on the multiple biometrics test results to determine an identity result, wherein the first data fusion operation includes weighting the multiple biometrics test results and applying a threshold to the weighted test results to determine the identity result;

biological state sensing circuitry configured to perform at least one biological state test;

biological state processing circuitry configured to determine one or more biological state test results of the individual based on the at least one biological state test; and decision circuitry configured to grant authority to the individual based on the identity result and the one or more biological state results.

14. The system of claim 13, wherein at least one biometrics test is based on an adaptive system capable of accounting for physiological changes of the individual due to aging.

15. The system of claim 13, wherein at least one biological state test is customized based on pre-stored normal physiological information of an individual identified by the identity result.

16. The system of claim 13, wherein a first biological state test is customized based on a biological state test result of a second biological state test.

17. The system of claim 13, wherein at least one biological state test is adapted to a macro environment condition affecting the individual.

18. The system of claim 13, wherein the decision circuitry is adaptable to a macro environment condition affecting the individual.

19. The system of claim 13, wherein the biological state processing circuitry is capable of performing a data fusion operation using data from at least two biological state tests to determine a first biological state test result, and wherein the decision circuitry is configured to grant authority to the individual based on the first biological state result.

20. The system of claim 13, wherein a second biological state result of a second biological state test is interpreted differently based on a first biological state test result of a first biological state test.

21. A system for determining whether a particular individual is to be granted authority, comprising:

a biometrics test means for performing multiple biometrics tests on the individual to retrieve multiple biometrics test results;

a biometrics processing means for performing at least a first data fusion operation on the multiple biometrics test results to determine an identity result, wherein the first data fusion operation includes weighting the multiple biometrics test results and applying a threshold to the weighted test results to determine the identity result;

a biological state test means for performing at least one biological state test;

a biological state processing means for determining one or more biological state test results of the individual based on the at least one biological state test; and a decision means for conditionally granting authority to the individual based on the identity result and the one or more biological state results.

* * * * *